(12) United States Patent
Beaudoin et al.

(10) Patent No.: US 9,758,611 B2
(45) Date of Patent: Sep. 12, 2017

(54) PROCESS FOR RECOVERING BROMINATED STYRENE-BUTADIENE COPOLYMER FROM AN ORGANIC SOLVENT

(71) Applicant: Dow Global Technologies LLC, Midland, MI (US)

(72) Inventors: Daniel A. Beaudoin, Midland, MI (US); John W. Hull, Jr., Midland, MI (US); Michal E. Porter, Midland, MI (US); William G. Stobby, Ann Arbor, MI (US); Gerald F. Billovitz, Midland, MI (US); Timothy J. Young, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/101,383

(22) PCT Filed: Dec. 12, 2014

(86) PCT No.: PCT/US2014/070026
§ 371 (c)(1),
(2) Date: Jun. 2, 2016

(87) PCT Pub. No.: WO2015/100037
PCT Pub. Date: Jul. 2, 2015

(65) Prior Publication Data
US 2016/0304649 A1    Oct. 20, 2016

Related U.S. Application Data

(60) Provisional application No. 61/921,499, filed on Dec. 29, 2013.

(51) Int. Cl.
| | | |
|---|---|---|
| C08G 63/02 | (2006.01) | |
| C08F 236/16 | (2006.01) | |
| C08C 2/06 | (2006.01) | |
| C08J 9/00 | (2006.01) | |
| C08L 9/06 | (2006.01) | |

(52) U.S. Cl.
CPC .............. *C08F 236/16* (2013.01); *C08C 2/06* (2013.01); *C08J 9/0061* (2013.01); *C08L 9/06* (2013.01); *C08J 2201/03* (2013.01); *C08J 2325/04* (2013.01); *C08J 2409/06* (2013.01)

(58) Field of Classification Search
CPC ..................................... C08F 236/16
USPC ........................................... 521/40
See application file for complete search history.

(56) References Cited

FOREIGN PATENT DOCUMENTS

| WO | 2008/021417 A | 2/2008 |
|---|---|---|
| WO | 2010/017134 A | 2/2010 |
| WO | 2012/044483 A | 4/2012 |
| WO | 2012/058002 A | 5/2012 |
| WO | 2013/048785 A | 4/2013 |

*Primary Examiner* — Terressa Boykin

(57) ABSTRACT

Brominated styrene-butadiene copolymers are recovered from solution in an organic solvent. The copolymer solution is mixed with a liquid non-solvent in the presence of a suspension stabilizer to form a dispersion. The dispersion is heated to vaporize the organic solvent. This process produces precipitated copolymer particles having useful particle sizes, which can be easily used in downstream applications.

14 Claims, No Drawings

PROCESS FOR RECOVERING BROMINATED STYRENE-BUTADIENE COPOLYMER FROM AN ORGANIC SOLVENT

The present invention relates to a process for recovering a brominated styrene-butadiene copolymer from an organic solvent.

Brominated styrene-butadiene copolymers are emerging as effective flame retardants for polystyrene-based foams and other organic polymer applications. These brominated copolymers are described, for example, in WO 2008/021417. They can be prepared by brominating a precursor styrene-butadiene copolymer with certain quaternary ammonium tribromides or quaternary phosphonium tribromides.

The bromination reaction is normally performed while the styrene-butadiene copolymer is dissolved in an appropriate organic solvent. After bromination, the polymer must be recovered from the solvent and the residual solvent content must be reduced to very low levels. Therefore, methods are needed to effectively separate the brominated copolymer from the solvent.

The problem is complicated because recovering the brominated copolymer in the correct physical form provides significant benefits when the brominated copolymer is blended with other polymers and processed into shaped articles. If the particles are too small, they form fine powders. The powders are difficult to disperse within another polymer in a melt-processing operation and, like most fine powders, can be difficult to handle since the particles can easily become air-borne. Because of this, a fine particulate brominated copolymer is usually compacted into larger granules. The compaction step adds operating and equipment costs, and for that reason it would be desirable to avoid it. The larger granules ideally will break up easily upon the application of minimal force, but this is usually not the case. The compaction step is difficult to control. Many particles are compressed excessively and form large agglomerates that do not disperse well in subsequent blending operations.

WO 2008/021417 describes a precipitation method for recovering the brominated styrene-butadiene copolymer from the bromination process solution. The brominated copolymer process solution is added to a large amount of an anti-solvent. The process solvent and anti-solvent are generally completely miscible in all proportions. When they are mixed, the process solvent and anti-solvent form a single liquid phase in which the brominated copolymer is no longer soluble. The brominated copolymer therefore precipitates and is recovered in the form of a particulate solid.

From the standpoint of producing the brominated copolymer in a useful physical form, the anti-solvent process of WO 2008/021417 works well. The brominated copolymer particles compact easily to form granules that crush easily, and so it is not difficult to disperse the brominated copolymer into other polymers. The main problem with the anti-solvent approach is its high cost. A single phase mixture of solvent and anti-solvent remains after the brominated copolymer has been precipitated and separated. An expensive distillation step is needed to separate the process solvent and the anti-solvent so they can be re-used in the process or otherwise recycled.

WO 2012/058002 and WO 2013/048785 describe melt devolatilization processes for removing the process solvent and other volatiles from the brominated styrene-butadiene copolymer. These methods can reduce the solvent content of the brominated copolymer to very low levels, but require a large amount of energy, and also require the addition of a second, thermoplastic polymer to improve the processibility of the brominated copolymer in the devolatilization process. The added polymer increases the cost of this process and its presence in the product may not always be suitable.

WO 2010/017134 describes a transfer process in which the brominated styrene-butadiene copolymer is first transferred into a non-solvent such as water, and then re-transferred to a second solvent. In this process, the brominated copolymer solution is first atomized and the solvent then is removed from the resulting droplets. The droplets are immersed in the non-solvent during or after the solvent removal process. Heat required to vaporize the solvent is in most cases supplied by applying a jet of steam at or near the location where the atomization occurs (either within the non-solvent phase near the point where the solution is injected, or in the headspace). This process effectively removes the process solvent to very low levels in the brominated copolymer; however, the process has several problems. Although the process is continuous, it tends to be slow because of the atomization step. More significantly, the process forms very small particles, which are problematic as already described.

A third problem with the process described in WO 2010/017134 involves the use of the brominated copolymer in making ignition resistant polymer foams. When blended with styrene-based copolymers and extruded to form a foam using volatile organic blowing agents, the brominated styrene-butadiene copolymers recovered in this manner have been found to adversely affect the cell size. The average cell size decreases, which is a problem because smaller cells cannot expand the polymer as efficiently. The foam densities are therefore higher, and it can be difficult to produce foams that have larger cross-sectional areas.

An efficient process for recovering a brominated styrene-butadiene copolymer from solution is desired. Such a process would be economical, and would produce the brominated styrene-butadiene copolymer in a physical form that is easy to handle and facilitates blending with another polymer. It would also be beneficial if the recovered brominated styrene-butadiene copolymer had a smaller effect on foam cell size than brominated styrene-butadiene copolymer particles recovered by the process described in WO 2010/017134.

This invention is a process for recovering a brominated styrene-butadiene polymer from an organic solvent comprising (1) forming a mixture of A) a solution of the brominated styrene-butadiene polymer dissolved in the organic solvent and B) a liquid non-solvent, in the presence of C) at least one organic suspension stabilizer, wherein:

a) the brominated styrene-butadiene copolymer is soluble to the extent of no greater than 5 parts by weight per 100 parts by weight of the liquid non-solvent at the temperature at which step (3) is performed, b) solvent and liquid non-solvent are soluble in each other to the extent of no more than about 5 parts by weight of one per 100 parts by weight of the other at the temperature at which step (3) is performed, c) the liquid non-solvent has a boiling temperature at atmospheric pressure at least 10° C. greater than the lower of i) the boiling temperature of the organic solvent and ii), if the liquid non-solvent forms an azeotrope with the organic solvent which azeotrope has a lower boiling temperature than the organic solvent by itself, the boiling temperature of the azeotrope, d) the volume ratio of A) to B) in the mixture formed in step (1) is no greater than 1:1, and e) at the time step (1) is performed, the temperature of each of A) and B) is at least 10° C. below the lower of i) the boiling temperature of the organic solvent at atmospheric pressure and ii), if the organic solvent forms an azeotrope with the liquid non-solvent which azeotrope has a lower boiling temperature than the organic solvent by itself, the boiling temperature of such azeotrope;

(2) agitating the mixture of A), B) and C) to form droplets of A) dispersed in B);

(3) heating the dispersion formed in step (2) to a temperature below the boiling temperature of the liquid non-solvent but sufficient to vaporize the organic solvent by itself or as an azeotrope with the liquid non-solvent, such that the organic solvent vaporizes and is removed from the dispersion and the brominated styrene-butadiene copolymer precipitates to form particles, and (4) removing the precipitated particles of brominated styrene-butadiene copolymer from the liquid non-solvent.

The process provides several advantages. The organic solvent is removed effectively to very low levels. Because the organic solvent and the liquid non-solvent are immiscible, there is little difficulty in separating them so they can be recycled or otherwise recovered. A preferred liquid non-solvent is water, which is inexpensive and environmentally benign.

In addition, the process produces highly spherical primary particles. Although the primary particles can be characterized by a wide range of particle diameters, such as 0.05 to 250 μm, the particle size can be tailored through selection of the type and amount of suspension stabilizer. Typically, the primary particle size is on the order of 10 to 100 μm. The primary particle size distribution is usually quite narrow, which, along with the sphericity of the primary particles, greatly improves the homogeneity of dispersion of the particles into another polymer. Another significant advantage is that the primary particles often form and are recovered as loosely agglomerated masses. The agglomerated masses have effective diameters of 0.5 mm or more; their effective diameters can be as large as about 15 mm. These agglomerates do not require compaction. They are easily handled, produce little dust, and are easily broken apart (by crushing or light grinding, for example, or even under the shear produced within polymer processing equipment such as an extruder), and can be blended with other polymers easily.

The brominated styrene-butadiene copolymer preferably is made by brominating a precursor styrene-butadiene copolymer. The brominated styrene-butadiene copolymer may be a random copolymer or graft copolymer. The precursor styrene-butadiene copolymer preferably is a block copolymer containing one or more polystyrene blocks and one or more butadiene blocks. Some random co-polymerization may be present at or near the boundaries of the respective blocks. Such a block copolymer may be a styrene-butadiene diblock copolymer or a styrene-butadiene-styrene triblock copolymer or even a higher order copolymer, such as a tetra- or pentablock copolymer. The butadiene repeating units may constitute, for example, 10 to 95% of the total weight of the precursor copolymer. The butadiene units may be 1,2-butadiene units or 1,4-butadiene units or a combination of both types. It is preferred that at least 50%, more preferably at least 70% and still more preferably at least 85% of the butadiene units are 1,2-butadiene units.

Both the aromatic rings of the styrene repeating units and the butadiene repeating units are susceptible to bromination, and the invention is applicable to copolymers having bromination at either or both types of sites. However, bromination at aliphatic carbons is generally preferable, especially when the aliphatic bromines are not bonded to tertiary or allylic carbon atoms. Therefore, a preferred brominated copolymer has at least 90%, preferably at least 98% of the bromine bonded to aliphatic carbon atoms in the butadiene units of the precursor copolymer.

A convenient bromination process is that described in WO 2008/21417. In such a process, the precursor copolymer is brominated in solution in an organic solvent. The brominating agent is a quaternary ammonium tribromide, although quaternary phosphonium tribromides as described in U.S. Pat. No. 8,372,921 also can be used. These brominating agents have been found to be very selective for bromination of the butadiene units.

The brominated copolymer preferably contains 10 to 75%, more preferably 40 to 70% and still more preferably 50 to 70% by weight bromine. It preferably exhibits a 5% weight loss temperature of at least 225° C., more preferably at least 240° C., as determined by thermogravimetric analysis using the following method: ~10 milligrams of the brominated copolymer is analyzed using a TA Instruments model Hi-Res TGA 2950 or equivalent device, under a flow of gaseous nitrogen and a heating rate of 10° C./min over a range of from room temperature (nominally 25° C.) to 600° C. The mass of the sample when it reaches a temperature of 100° C. is determined. The mass lost by the sample is monitored as the sample is heated further, and the temperature at which the sample has lost 5% of its weight is designated the 5% weight loss temperature (5% WLT).

The organic solvent is a liquid at room temperature. Its boiling temperature preferably is at least 35° C. at one atmosphere pressure. It may be as high as 150° C. in some embodiments, but preferably the boiling temperature is no more than 100° C. and more preferably no more than 85° C.

Examples of suitable organic solvents include ethers such as tetrahydrofuran; halogenated alkanes such as carbon tetrachloride, chloroform, dichloromethane and 1,2-dichloroethane; aliphatic hydrocarbons such as pentane, hexane, cyclohexane, cyclooctane, isooctane, isohexane, and the like, aromatic hydrocarbons such as benzene and toluene, and halogenated aromatic compounds such as monochlorobenzene.

The solution of the brominated styrene-butadiene copolymer may be a crude or partially purified solution from the bromination reaction.

The concentration of the brominated styrene-butadiene copolymer in the organic solvent may be, for example 1 to 50 weight-percent, preferably 15 to 25 weight percent.

The liquid non-solvent is a material that is liquid at 25° C. It is selected in conjunction with the organic solvent to meet the following conditions a) to c):

a) The brominated styrene-butadiene copolymer is soluble in the liquid non-solvent (if at all) to the extent of no greater than 5 parts by weight per 100 parts by weight at the temperature at which step (3) of the process is performed. The brominated styrene-butadiene copolymer preferably is soluble in the liquid non-solvent to the extent of no more than 2 parts by weight, more preferably no more than 0.5 parts by weight, per 100 parts by weight of the liquid non-solvent at the temperature at which step (3) is performed.

b) The solvent and liquid non-solvent are soluble in each other to the extent of no more than about 5 parts by weight, more preferably no more than about 2 parts by weight, of one per 100 parts by weight of the other, at the temperature at which step (3) is performed.

c) The liquid non-solvent has a boiling temperature at atmospheric pressure at least 10° C. greater than the lower of i) the boiling temperature of the organic solvent and ii), if the liquid non-solvent forms an azeotrope with the organic solvent, which azeotrope has a lower boiling temperature than the organic solvent by itself, the boiling temperature of the azeotrope. If the liquid non-solvent does not form an azeotrope with the organic solvent, the boiling temperature of the liquid non-solvent is preferably at least 15° C. greater, more preferably at least 30° C. greater, than the boiling temperature of the organic solvent. If the liquid non-solvent and organic solvent form an azeotrope having a lower boiling temperature than that of the organic solvent by itself, then the boiling temperature liquid non-solvent by itself preferably is at least 15° C., more preferably at least 30° C., higher than that of the azeotrope. It is also preferred that the composition of such an azeotrope includes at least 50%, more preferably at least 65%, by weight of the organic solvent.

The liquid non-solvent preferably has a boiling temperature of at least 100° C. at one atmosphere pressure.

The liquid non-solvent preferably is not reactive with the brominated styrene-butadiene copolymer under the conditions of the process. The liquid non-solvent preferably is water or an aqueous liquid that contains mainly water, but may also be, for example, a silicone oil or a fluorinated compound such as a partially fluorinated or perfluorinated alkane or a perfluoroether.

The organic suspension stabilizer is an organic material that stabilizes the dispersed droplets of the brominated styrene-butadiene solution in the liquid non-solvent and reduces their tendency to reagglomerate into large masses that grossly phase separate from the liquid non-solvent. Suitable stabilizers include surfactants, including non-ionic, anionic and cationic types, and various types of polymers that are soluble in the liquid non-solvent. Among these polymers, polymers that are soluble in water at room temperature (about 25° C.) are preferred.

Examples of useful nonionic surfactants include poly(oxyethylene)alkyl ethers such as octaethylene glycol monododecyl ether and pentaethylene glycol monododecyl ether; poly(oxypropylene) alkyl ethers; glucoside alkyl ethers such as decyl glucoside, lauryl glucoside and octyl glucoside; poly(oxyethylene glycol) alkylphenol ethers; glycerol alkyl esters; alkoxylated fatty amines; alkylamide monoethanol amines; alkyl amine oxides; and block copolymers of propylene glycol and ethylene glycol.

Examples of useful anionic surfactants include ammonium and/or alkali metal sulfate, sulfonate, carboxylate and/or phosphate salts that have an alkyl chain of 8 or more carbon atoms. Examples of these include, for example, fatty acid sulfate salts, fatty acid sulfonate salts, poly(oxyethylene) alkyl ether sulfates and sulfonates, and the like. Specific examples of such surfactants include, for example, ammonium lauryl sulfate, sodium lauryl sulfate, sodium laureth sulfate, sodium myreth sulfate, alkali metal and ammonium salts of fatty acids such as potassium oleate, and the like.

Examples of useful cationic surfactants include alkyltrimethylammonium salts, cetyl pyridinium chloride, benzalkonium chloride, benzethonium chloride; dimethyldioctadecylammonium chloride, cetrimonium bromide, dioctadecyldimethylammonium bromide and the like.

Examples of organic polymers include water-soluble polymers such as, for example, methyl cellulose, hydroxypropylmethyl cellulose, poly(vinyl pyrrolidone), poly(vinyl alcohol), polymers of ethylene oxide and/or ethylene glycol, and the like.

Mixtures of any two or more suspension stabilizers can also be used.

An effective amount of suspension stabilizer(s) is used. A suitable amount may be, for example, 0.01 to 5 parts, preferably 0.1 to 2 parts, and more preferably 0.1 to 1 parts, by weight per 100 parts by weight of the non-solvent liquid. The amount of stabilizer can affect the primary particle size of the recovered brominated copolymer, with smaller amounts generally leading to an increase in primary particle size. Excessive amounts of suspension stabilizer(s) can result in the formation of very fine particles which are difficult to filter and to blend into another polymer. Thus, the amount of stabilizer used can be manipulated to adjust the primary particle size to a desirable range. The amount of suspension stabilizer also may affect the extent to which the primary particles form agglomerates.

The solution A) of the brominated styrene-butadiene polymer in the organic solvent is mixed with the liquid non-solvent B) in the presence of the suspension stabilizer(s) C) and the mixture is agitated to disperse A) as droplets in B). B) forms a continuous phase in the mixture. The volume ratio of A) to B) after step 1) is no greater than 1:1, and is preferably no greater than 0.25:1. In some embodiments, the volume ratio of A) to B) is 0.1:1 or less.

The mixing and dispersing steps can be performed simultaneously or sequentially.

The suspension stabilizer C) should be mixed with the liquid non-solvent and/or the brominated styrene-butadiene copolymer solution before or at the same time as components A) and B) are combined.

The mixing step can also be performed in two or more sub-steps. For example, the brominated styrene-butadiene copolymer solution can be added to a small amount of the liquid non-solvent (in the presence of the suspension stabilizer), and dispersed therein to form a pre-emulsion, in which one of the components forms a continuous phase and the other forms a dispersed phase. Typically, the brominated styrene-butadiene solution will form the dispersed phase in such a pre-emulsion. The dispersed phase in such a pre-emulsion may constitute 50% or more of the volume of such a pre-emulsion. This pre-emulsion can then be added to the remaining amount of the liquid non-solvent to form the dispersion of component A) in component B).

At the time the mixing step is performed, the temperature of the A) and B) components should each be at least 10° C. below the lower of i) the boiling temperature of the organic solvent and ii), if the organic solvent forms an azeotrope with the liquid non-solvent, which azeotrope has a lower boiling temperature than the organic solvent by itself, the boiling temperature of such azeotrope. In some embodiments, the A) and B) components are each at a temperature of 10 to 30° C. when combined.

In a preferred process, the A) and B) components are each charged to a tank or other batch or semi-batch vessel equipped with a mechanical agitation apparatus. The agitation apparatus may be, for example, one or more blade paddles, dispersing homogenizing blades, spiral propeller blades, and the like, mounted on one or more shafts within the vessel and rotated by an appropriate agitation drive system. Upon charging the starting materials, the mixture is agitated to disperse component A) into component B) and break it into droplets.

The droplets may have diameters, for example, of 0.001 μm to 1 mm, with a preferred range being 0.50 to 200 μm. This can be controlled to some extent through the intensity of agitation and the amount of suspension stabilizer.

The resulting dispersion is then heated to a temperature sufficient to volatilize the organic solvent (by itself or as an azeotrope with the non-solvent liquid) and held at such temperature. The volatilized organic solvent (or azeotrope) is removed from the dispersion by, for example, a pressure driven transfer, sweep gas, or application of vacuum, and is then optionally condensed for recovery and reuse. Preferably at least 95%, more preferably at least 98% and still more preferably at least 99% by weight of the organic solvent is removed in this step. Most preferably, at least 99.5% of the weight of the solvent is removed. Because of the relatively large amount of liquid non-solvent that is present, some amount of the liquid non-solvent remains after the conclusion of the heating step, even in cases in which part of the liquid non-solvent is removed during the heating step as an azeotrope with the organic solvent.

The heating step can be performed at approximately normal atmospheric pressure (for example, 95 to 110 kPa) or can be performed at a superatmospheric or subatmospheric pressure. The pressure may be manipulated, for example, to increase the boiling temperature of the liquid non-solvent to prevent its volatilization, to decrease the boiling temperature of the organic solvent, or to increase the spread between the boiling temperatures of the organic solvent and liquid non-solvent or azeotrope as described before to facilitate the selective removal of the organic solvent. The temperature during the heating step is below the boiling temperature of the liquid non-solvent at the pressure conditions used.

Agitation is provided, if necessary, during the heating step to maintain the brominated styrene-butadiene copolymer solution dispersed as droplets in the liquid non-solvent until the brominated styrene-butadiene copolymer precipitates and forms particles. The brominated styrene-butadiene copolymer precipitates as the organic solvent is removed and forms small particles. The particles can be suspended in the liquid non-solvent. Some or all of the particles may precipitate from the liquid non-solvent.

The organic solvent removed in this manner can be recycled or otherwise reused. If necessary, the recovered organic solvent may undergo one or more purification steps before being recycled or reused.

The precipitated brominated copolymer particles are recovered from the liquid non-solvent. Because the particles are solids, they can be recovered using conventional solid-liquid separation techniques such as filtration, centrifugation, vacuum filtration and the like.

If desired, the copolymer particles can be washed to remove residual liquid non-solvent or other impurities, and dried to remove residual organic solvent and/or liquid non-solvent.

An advantage of this process is that the brominated styrene-butadiene copolymer particles are produced with very useful particle sizes. Although particles having diameters as small as 0.05 µm can be produced, typically few particles are produced having diameters of less than 10 µm. Very large masses also do not form. The product typically produces primary particles having diameters of 20 to 250 µm. Primary particle sizes are conveniently measured using light-scattering methods such as described in the following examples.

The primary particles often exhibit a narrow particle size distribution in which the ratio (d90-d10)/d50, (where d90 describes the diameter where 90 volume % of the distribution has a smaller particle size, d10 describes the diameter where 10 volume % of the distribution has a smaller particle size, and d50 describes the diameter where 50 volume % of the distribution has a smaller particle size) is, for example, less than 2, preferably 0.25 to 1.9.

Some or all of the primary particles may form loosely agglomerated masses having longest dimensions of, for example, 500 µm up to about 15 mm, especially from 1 to 15 mm. Agglomerate lengths of this scale can be measured visually or microscopically. These agglomerated masses crush easily to form fine powders of primary particles or smaller agglomerates, which are easily handled. If desired, the process of the invention can include such an agglomerate crushing or grinding step. After crushing, the crushed or ground agglomerates may have an average diameter of, for example, 20 µm to 500 µm as measured by light scattering methods.

The brominated styrene-butadiene copolymer particles are useful as flame retardant additives for a variety of combustible polymers. "Combustible" here simply means that the polymer is capable of being burned. Combustible polymers of interest include polyolefins such as polyethylene (including copolymers of ethylene such as ethylene-α-olefin copolymers); polypropylene and the like; polycarbonates and blends of polycarbonates such as blends of a polycarbonate with a polyester, a polyolefin, an acrylonitrile-styrene-butadiene resin or polystyrene; polyamides; polyesters; epoxy resins; polyurethanes; and polymers of vinyl aromatic monomers, as well as other flammable polymers in which the flame retardant additive can be dissolved or dispersed.

Polymers and copolymers of vinyl aromatic monomers are of particular interest as the combustible polymer. A "vinyl aromatic" monomer is a compound having at least one polymerizable ethylenically unsaturated group bonded directly to a carbon atom of an aromatic ring. Vinyl aromatic monomers include unsubstituted materials such as styrene, divinylbenzene and vinyl naphthalene, as well as compounds that are substituted on the ethylenically unsaturated group (such as, for example alpha-methylstyrene), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene, 2,4-dimethylstyrene, and 4-t-butylstyrene. Preferred vinyl aromatic monomers are styrene, alpha-methyl styrene, 4-methyl styrene, divinylbenzene and mixtures thereof.

Especially preferred combustible polymers are polystyrene, styrene-acrylonitrile copolymers, styrene-acrylic acid copolymers, styrene-maleic anhydride copolymers, styrene-acrylonitrile-butadiene (ABS) resins, high impact polystyrene resins containing a block copolymer or grafted impact modifier, and polystyrene-poly(phenylene ether) blends. Polystyrene is an especially preferred combustible polymer.

Another combustible polymer of interest is a random, block or graft copolymer of butadiene and at least one vinyl aromatic monomer.

Still other combustible polymers of interest are isocyanate-based polymers such as a polyurethane, a polyurea, a polyurethane-urea, a polycarbodiimide, a polyisocyanurate or a polyurethane-isocyanurate. These are made by curing a polyisocyanate by itself (for a polyisocyanurate) or with a polyamine, aminoalcohol, polyol and/or water as curing agent to form a polyurethane, a polyurea, a polyurethane-urea, a polycarbodiimide, a polyisocyanurate or a polyurethane-isocyanurate. The brominated styrene-butadiene copolymer can be mixed with the polyisocyanurate and/or the curing agent(s), and the isocyanate-based polymer is then formed by curing the polyisocyanate in the presence of the brominated styrene-butadiene copolymer.

A sufficient quantity of brominated styrene-butadiene copolymer is incorporated into the combustible polymer to improve the performance of the combustible polymer in one or more standard flammability tests. A suitable amount is typically enough to provide the blend with a bromine content of 0.3 to 20 weight percent, more suitably 0.5 to 10 weight percent and even more suitably 1.5 to 5 weight percent.

Formulated polymer blends in accordance with the invention may include other additives such as other flame retardant additives, flame retardant adjuvants, thermal stabilizers, ultraviolet light stabilizers, anti-static agents, lubricants, nucleating agents, antioxidants, foaming agents, acid scavengers, infrared absorbers and reflectors and coloring agents to meet the needs of various applications.

Polymer blends in accordance with the invention may be melt or solution processed to form a wide variety of products. Expanded (cellular) products are of interest because of their use in various construction and automotive applications, in which flammability performance is a concern. An expanded combustible polymer may have a foam density of about 0.5 to about 30 pounds per cubic foot (pcf) (16-480 kg/m$^3$), especially about 1.2 to about 10 pcf (19.2 to 160 kg/m$^3$) and most preferably about 1.2 to about 4 pcf (19.2 to 64 kg/m$^3$). Expanded polymers of vinyl aromatic polymers, butadiene polymers and copolymers of vinyl aromatic polymers and/or butadiene polymers, as described above, are of particular interest. The expanded polymers may be used, for example, as insulating and/or cushioning materials in construction, household, automotive, textile coatings and other applications. Expanded polymers of the invention can also be used as an attached cushion or underlayment for carpeting.

Brominated styrene-butadiene copolymers made and recovered using certain previously-known processes tend to affect the cell size when used as a flame retardant in extruded polystyrene-based foams, such as polystyrene and styrene-acrylonitrile copolymer foams. The presence of the brominated styrene-butadiene copolymers has been shown to reduce the cell size and increase foam density, often by 50% or more. An unexpected advantage of this invention is that these effects are significantly reduced when the brominated styrene-butadiene copolymer is recovered via this process. Typically, the reduction is cell size is less than 40% and is often less than 25%.

The following examples are provided to illustrate the invention and are not intended to limit the scope thereof. All parts and percentages are by weight unless otherwise indicated.

EXAMPLE 1

About 2 liters of a 15% solution of a brominated styrene-butadiene copolymer (containing 66% bromine) in methylene chloride are blended in a high speed homogenizer with 120 g of water containing 1.2 g sodium lauryl sulfate. Each component is at room temperature at the time of mixing. The resulting pre-emulsion is added to 8 liters of room temperature water in a stirred vessel equipped with a heating jacket, forming a dispersion of brominated copolymer solution in the aqueous phase. The heating jacket is turned on, and the contents of the vessel are heated. The methylene chloride vaporizes when the temperature reaches about 39° C., and is recovered by passing the vapors through a chilled condenser. As the methylene chloride is removed, the brominated styrene-butadiene copolymer precipitates to form dispersed particles. After the methylene chloride is removed, the particles are filtered from the aqueous phase and dried at room temperature and ambient pressure for 21 days.

The dried material is in the form of granular agglomerates that have an average size of 6.6 mm. The agglomerates are easily crushed to form a fine powder consisting mainly of particles and small agglomerates having diameters of 20 to 250 μm.

Particle sizes in this and subsequent examples are volume average sizes determined using a Beckman Coulter LS13-320 particle size analyzer with a Universal Liquid Module sample delivery system, running software version 6.01 and calibrated against a Coulter LATRON™ 300 LS latex standard. The instrument conforms to the ISO 13-320 standard. The analysis conditions for all measurements include a fluid refractive index of 1.332, a sample real refractive index of 1.5, and a sample imaginary refractive index of 0.0. The extended optical model is not employed. The polarization intensity differential scattering (PIDS) option is activated and used to generate the particle size information.

The recovered product contains about 5000 ppm of residual methylene chloride and 1.4% total impurities, as determined by $C^{13}$ NMR. Its 5% weight loss temperature is 251° C.

A portion of the crushed agglomerate is dry blended with thermal stabilizers and fed as a powder to a conical twin screw extruder, where it is melt blended with polystyrene and pelletized to form a concentrate containing about 37% by weight of the brominated styrene-butadiene copolymer. These pellets are then let down with additional polystyrene and extruded in the presence of blowing agents to form an extruded polystyrene foam. The cell size of the foam is measured visually using an optical microscope.

For comparison, a control polystyrene foam is made under otherwise identical conditions with a brominated styrene-butadiene copolymer which has been recovered from the bromination process solution by an anti-solvent precipitation method as described in WO 2008/021417. The cell size is measured as before. The cell size of the foams made with the brominated styrene-butadiene copolymer recovered by the Example 1 process are about 33% smaller than those of the control foam.

EXAMPLE 2

40 grams of hydroxypropylmethyl cellulose (Methocel™ E3 from the Dow Chemical Company) are dissolved in 1 liter of deionized water and then diluted with 7 liters of deionized water containing 20 grams of sodium lauryl sulfate. 2 liters of a room temperature 15% solution of a brominated styrene-butadiene copolymer in methylene chloride (as described in Example 1) are mixed with the room temperature aqueous phase in a stirred vessel equipped with a heating jacket. The mixture is heated, and methylene chloride vaporizes when the temperature reaches about 38° C. The methylene chloride vapors are condensed in an attached water-cooled condenser. The brominated styrene-butadiene copolymer precipitates to form particles as the methylene chloride is removed. The particles are filtered and dried at ambient temperature and pressure for 21 days. The dried material is in the form of primary particles and small agglomerates. The volume average particle size is about 55 μm. The particles contain about 1250 ppm of residual methylene chloride and 1.4% total impurities, as determined by $C^{13}$ NMR. The 5% weight loss temperature for this sample of brominated styrene-butadiene copolymer is 260° C.

The recovered copolymer is melt blended with polystyrene and pelletized to form a concentrate, which is then let down and extruded to produce a polystyrene foam as described in Example 1. The change in cell size as compared to the control foam is shown in Table 1.

Comparative Sample A

About 2 liters of a room temperature 15% solution of brominated styrene-butadiene copolymer in methylene chloride (as described in Example 1) is added to 10 liters of room temperature deionized water in a stirred vessel equipped with a heating jacket. The water contains no suspension stabilizer. The mixture is heated. The methylene chloride vaporizes when the temperature reaches about 40° C. The methylene chloride vapors are condensed in an attached water-cooled condenser. The brominated styrene-butadiene copolymer precipitates and forms a single large agglomerated mass in the vessel. The liquid phase is poured off the agglomerated mass, which is filtered and dried at ambient temperature and pressure for 21 days. The recovered solid mass cannot be blended with polystyrene or extruded to form a foam without an energy-intensive grinding process.

Comparative Sample B

The same brominated styrene-butadiene copolymer as described in Examples 1-2 and Comparative Sample A is recovered from methylene chloride using a process as described in WO 2010/017134. 2 liters of a 15% solution are filtered through a 1.2 mm filter under nitrogen to remove particulate matter. The filtered solution is then injected subsurface through a 3 mm tube into a rapidly stirred vessel containing 85° C. deionized water. Methylene chloride is removed and condensed. Particles form almost immediately as the copolymer solution is introduced. The particles are recovered by filtration and dried for 34 days under ambient temperature and pressure. The d50 particle size is approximately 10 μm. The particles are compacted to form a granulate. These granules are compounded with polystyrene and then further let down and foamed as in Examples 1 and 2. The change in cell size as compared to the control foam is shown in Table 1.

TABLE 1

Comparison of the cell size of polystyrene foams extruded with brominated styrene-butadiene copolymer samples to the control polystyrene foam containing the brominated styrene-butadiene copolymer recovered by anti-solvent precipitation.

| Example | Change in Cell Size, % |
| --- | --- |
| 1 | −33% |
| 2 | −32% |
| A* | Not blendable or foamable without grinding |
| B* | −62% |

As can be seen from the data in Table 1, the brominated styrene-butadiene copolymer samples recovered by the method of the invention have a much smaller effect on cell size than does the sample recovered by the process of WO 2010/017134. In addition, the size of the brominated styrene-butadiene copolymers particles and agglomerates in Examples 1 and 2 is much larger than that of Comparative Sample B, which makes them much easier to handle and to blend into the polystyrene.

EXAMPLES 3-5

Example 3: 12.5 grams of poly(vinyl pyrrolidone) are dissolved in 2 liters of a 15% solution of brominated styrene-butadiene copolymer (containing 66% bromine) in methylene chloride. This solution is added to 10 liters of room temperature water containing 1.5 grams sodium lauryl sulfate in a stirred vessel equipped with a heating jacket. A dispersion of the brominated copolymer solution forms in the aqueous phase. The heating jacket is turned on, and the contents of the vessel are heated. When the temperature reaches about 39° C., the methylene chloride volatilizes away, and is recovered by passing the vapors through a chilled condenser. As the methylene chloride is removed, the brominated styrene-butadiene copolymer precipitates to form dispersed particles. After the methylene chloride is removed, the particles are filtered from the aqueous phase and dried at room temperature and ambient pressure for 21 days. The dried material is in the form of granular agglomerates that have an average size of 8.85 mm. The particles are easily crushed to form a fine powder consisting of primary particles and small agglomerates.

Example 4 is performed in the same way as Example 3, except that the amount of sodium lauryl sulfate is increased to 20 grams. The size of the agglomerates is reduced slightly to 6.8 mm.

Example 5 is also performed the same way, this time increasing the amount of sodium lauryl sulfate to 85 grams. A further slight reduction in agglomerate size, to 5.3 mm, is seen.

EXAMPLE 6

12.5 grams of poly(vinyl pyrrolidone) are dissolved in 3.1 kg of a 15% solution of a brominated styrene-butadiene copolymer (containing 66% bromine) in methylene chloride. This solution is blended in a high speed homogenizer with 120 g of water containing 1.2 g sodium lauryl sulfate. Each component is at room temperature at the time of mixing. The resulting pre-emulsion is added to 8 liters of room temperature water in a stirred vessel equipped with a heating jacket, forming a dispersion of the brominated copolymer solution in the aqueous phase. The heating jacket is turned on, and the contents of the vessel are heated. The methylene chloride volatilizes when the temperature reaches about 39° C. and is recovered by passing the vapors through a chilled condenser. As the methylene chloride is removed, the brominated styrene-butadiene copolymer precipitates to form dispersed particles. After the methylene chloride is removed, the particles are filtered from the aqueous phase and dried at room temperature and ambient pressure for 21 days. The dried material is in the form of granular agglomerates that have an average particle size of 7.85 mm. The particles are easily crushed to form a fine powder.

EXAMPLE 7

4.2 grams of poly(vinyl pyrrolidone) and 8.67 g of sodium lauryl sulfate are dissolved in 0.867 kg of a 15% solution of brominated styrene-butadiene copolymer (containing 66% bromine) in methylene chloride. This solution is blended in a high speed homogenizer with 113 g of water. Each component is at room temperature at the time of mixing. The resulting pre-emulsion is added to 8 liters of room temperature water in a stirred vessel equipped with a heating jacket, forming a dispersion of the brominated copolymer solution in the aqueous phase. The heating jacket is turned on, and the contents of the vessel are heated. The methylene chloride volatilizes when the temperature reaches about 39° C. and is recovered by passing the vapors through a chilled condenser. As the methylene chloride is removed, the brominated styrene-butadiene copolymer precipitates to form dispersed particles. After the methylene chloride is removed, the particles are filtered from the aqueous phase and dried at room temperature and ambient pressure for 21 days. The dried material is in the form of granular agglomerates that have an average particle size of 12.7 mm. The particles are easily crushed to form a fine powder.

EXAMPLES 8-9

1 kg of a 45% solution of brominated styrene-butadiene copolymer (containing 66% bromine) in methylene chloride is blended with 400 g water containing 2.5 g of sodium lauryl sulfate to form a pre-emulsion. Each component is at room temperature at the time of mixing. The pre-emulsion is added to 8 liters of room temperature water in a stirred vessel and the mixture heated as before to volatilize the methylene chloride and precipitate the brominated styrene-butadiene copolymer to form dispersed particles. The particle size is measured by light scattering methods. The particles form soft agglomerates having an average size of 1.77 mm.

Example 9 is prepared in a similar manner as Example 8. In this case, however, 0.5 kg of the 45% brominated styrene-butadiene copolymer solution is blended with 214 g of water containing 0.67 g sodium lauryl sulfate to form a concentrated pre-emulsion in the first step. After the emulsion is dispersed into water and the solvent is removed, the resulting agglomerate size (after drying) is 1-15 mm.

EXAMPLES 10-12

Example 10: 40 grams of hydroxypropylmethyl cellulose (Methocel™ E3 from the Dow Chemical Company) are dissolved in 1 liter of deionized water and then diluted with 7 liters of deionized water containing 80 grams of sodium lauryl sulfate. 1 kg of a room temperature 15% solution of a brominated styrene-butadiene copolymer in methylene chloride (as described in Example 1) is mixed with the room temperature aqueous phase, and the solvent is removed as described in Example 2. The agglomerate size (after drying) is similar to that of Example 2.

Example 11 is made in the same way as Example 10, except that the amount of sodium lauryl sulfate is reduced to 40 grams. The agglomerate size (after drying) is similar to that of Example 2.

Example 12 is made in the same way as Example 10, except that the amount of sodium lauryl sulfate is reduced to 20 grams. The agglomerate size (after drying) is similar to that of Example 2.

What is claimed is:

1. A process for recovering a brominated styrene-butadiene polymer from an organic solvent comprising
   (1) forming a mixture of A) a solution of the brominated styrene-butadiene polymer dissolved in the organic solvent and B) a liquid non-solvent, in the presence of C) at least one organic suspension stabilizer, wherein:
   a) the brominated styrene-butadiene copolymer is soluble to the extent of no greater than 5 parts by weight per 100 parts by weight of the liquid non-solvent at the temperature at which step (3) is performed,
   b) solvent and liquid non-solvent are soluble in each other to the extent of no more than about 5 parts by weight of one per 100 parts by weight of the other at the temperature at which step (3) is performed,
   c) the liquid non-solvent has a boiling temperature at atmospheric pressure at least 10° C. greater than the lower of i) the boiling temperature of the organic solvent and ii), if the liquid non-solvent forms an azeotrope with the organic solvent which azeotrope has a lower boiling temperature than the organic solvent by itself, the boiling temperature of the azeotrope,
   d) the volume ratio of A) to B) in the mixture formed in step (1) is no greater than 1:1, and
   e) at the time step (1) is performed, the temperature of each of A) and B) is at least 10° C. below the lower of i) the boiling temperature of the organic solvent at atmospheric pressure and ii), if the organic solvent forms an azeotrope with the liquid non-solvent which azeotrope has a lower boiling temperature than the organic solvent by itself, the boiling temperature of such azeotrope;
   (2) agitating the mixture of A), B) and C) to form droplets of A) dispersed in B);
   (3) heating the dispersion formed in step (2) to a temperature below the boiling temperature of the liquid non-solvent but sufficient to vaporize the organic solvent by itself or as an azeotrope with the liquid non-solvent, such that the organic solvent vaporizes and is removed from the dispersion and the brominated styrene-butadiene copolymer precipitates to form particles, and
   (4) removing the precipitated particles of brominated styrene-butadiene copolymer from the liquid non-solvent.

2. The process of claim 1, wherein the liquid non-solvent does not form an azeotrope with the organic solvent, and the liquid non-solvent has a boiling temperature at least 15° C. higher than the boiling temperature of the organic solvent.

3. The process of claim 2 wherein the organic solvent has a boiling temperature of 35 to 80° C.

4. The process of claim 2 wherein the organic solvent includes one or more of carbon tetrachloride, chloroform, dichloromethane, 1,2-dichloroethane, hexane, cyclohexane, cyclooctane, isooctane, isohexane, and benzene.

5. The process of claim 1 wherein the organic solvent forms an azeotrope with the liquid non-solvent, which azeotrope has a boiling temperature lower than that of the organic solvent by itself, and the boiling temperature of the liquid non-solvent is at least 15° C. higher than the boiling temperature of the azeotrope.

6. The process of claim 5 wherein the organic solvent is toluene or a chlorinated benzene.

7. The process of claim 1 wherein the liquid non-solvent is water.

8. The process of claim 1 wherein the suspension stabilizer includes at least one anionic, cationic, or nonionic surfactant.

9. The process of claim 8 wherein the surfactant includes at least one fatty acid sulfate salt, fatty acid sulfonate salt, poly(oxyethylene) alkyl ether sulfate, poly(oxyethylene) alkyl sulfonate, alkali metal salt of a fatty acid, or ammonium salt of a fatty acid.

10. The process of claim 1 wherein the suspension stabilizer includes at least one water-soluble organic polymer.

11. The process of claim 10, wherein the water-soluble organic polymer is methyl cellulose, hydroxypropylmethyl cellulose, poly(vinyl pyrrolidone), poly(vinyl alcohol), poly(ethylene glycol), poly(ethylene oxide) or a mixture of any two or more thereof.

12. The process of claim 1, wherein the volume ratio of A) to B) in step 1) is no greater than 0.25:1.

13. The process of claim 1, wherein at least a portion of the particles formed when the brominated styrene-butadiene copolymer precipitates in the liquid non-solvent to form agglomerates having longest dimensions from 500 µm to 15 mm.

14. The process of claim 13, further comprising crushing or grinding the agglomerates to form a powder having a volume average particle size of 20 to 500 µm.

\* \* \* \* \*